A. G. Waldo,

Mill Gearing.

No. 111,704.  Patented Feb. 7, 1871.

Witnesses:
Phil. T. Dodge
L. Hailer

Inventor:
A. G. Waldo
by Dodge & Munn
his attys

United States Patent Office.

ALBERT G. WALDO, OF MILWAUKEE, WISCONSIN.

Letters Patent No. 111,704, dated February 7, 1871.

IMPROVEMENT IN MILLSTONE BAILS AND DRIVERS.

The Schedule referred to in these Letters Patent and making part of the same.

*To all whom it may concern:*

Be it known that I, ALBERT G. WALDO, of the city of Milwaukee, in the county of Milwaukee and State of Wisconsin, have invented certain Improvements in Millstone Bails and Drivers, of which the following is a specification, reference being had to the accompanying drawing.

My invention relates to millstone bails and drivers, and consists in the novel construction and arrangement of rubber springs between suitable lugs arranged correspondingly and respectively on the interior of the bail and the periphery of the driver, as hereinafter explained, by means of which a cheap, simple, and convenient yielding mechanical device is provided, for preventing sudden jars between the drivers and the millstone, and which allows of ready adjustment for driving the stone in either direction, and permits the stone to be perfectly balanced.

In the drawing—

In constructing my device I make a millstone bail, C, of any size desired, with exterior lugs D for attaching it to, and within, the eye of a millstone.

Figure 1:
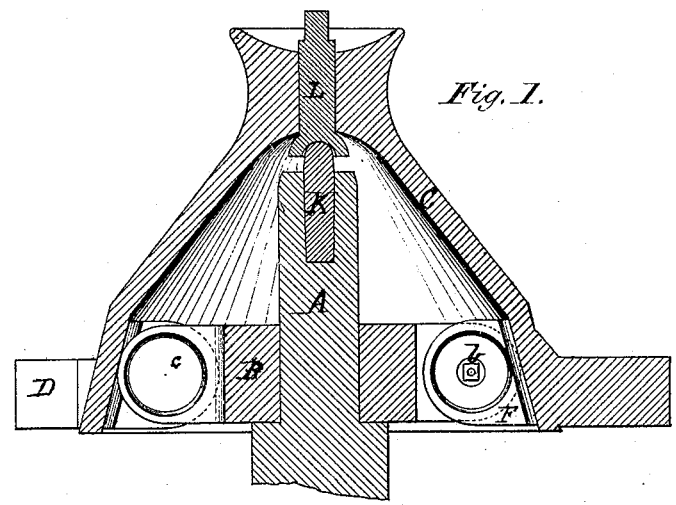
Figure 1 is a vertical cross-section on the line $x\ x$ of fig. 2.

In the center of this bail C is placed a steel thimble, L, to receive a steel point or cock-head K, in the end of a spindle, A, all as clearly shown in fig. 1, the spindle being connected to the driving-machinery of the mill.

Figure 2:
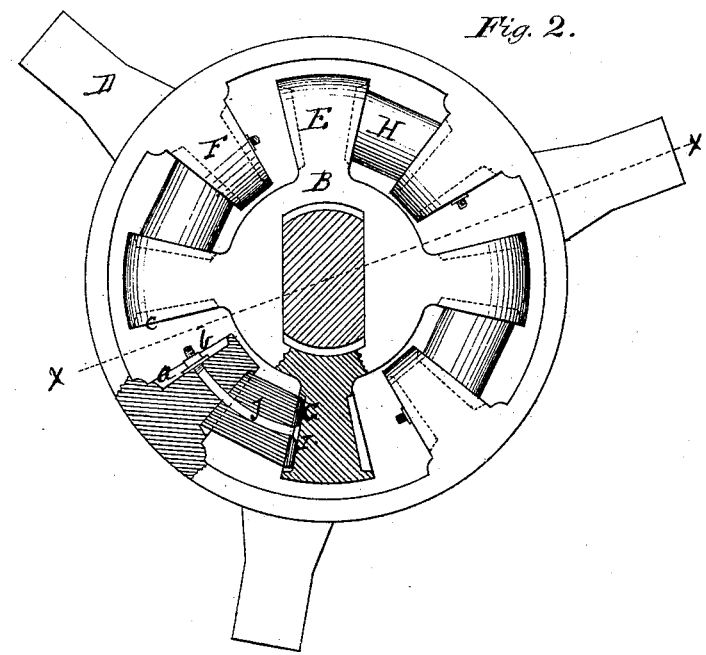
Figure 2 is a bottom plan view with a portion in cross-section.

On the interior of the bail C are arranged two or more lugs F, having circular recesses $a$ in both sides, as shown in fig. 1, and in dotted lines in fig. 2, to receive the ends of solid cylindrical rubber springs H.

These springs H are fastened in their seats by iron rods J, which pass through a circular metallic plate or disk, G, on the front end of the spring, then on through the spring and the lug to the recess on its opposite side, where it is secured by a nut and washer, $b$, as clearly seen in fig. 2.

The circular plates G on the end of the springs may be a little less in diameter than the springs, and the head of the bolt which secures them should be made to be flush with their outer surface, as shown in the same figure.

The driver B, through which the spindle A passes, is provided with the same number of lugs E on its periphery as are arranged on the interior of the bail C, whether two or more, and they are also provided with circular recesses $c$ on each side, as shown in fig. 1, and in dotted lines in fig. 2.

The lugs E upon the driver B are so arranged that the recesses will come immediately opposite the outer ends of the springs and allow the metal disks G to impinge or bear against their inner surface, as clearly shown in the sectional portion of fig. 2.

By this arrangement it will be seen that, as the driver revolves, its lugs are brought to bear against the rubber springs which interpose the requisite yielding mechanical device to prevent the jar that is always occasioned by sudden positive movements.

It will also be seen that the position of the rubbers can at any time be readily reversed and the stone driven in the opposite direction when desired, and that, because of the position of the lugs on the bail and driver, that the stone can be perfectly balanced.

While two rubber springs may be used with the corresponding number of lugs on the bail and on the driver, or more if desired, I have found that the best results were secured by the use of four, with the lugs arranged as shown in the drawing.

Having thus described my invention,

What I claim, is—

1. The millstone bail C, and driver B, in combination with the adjustable rubber springs H, when constructed and arranged substantially as herein described, for the purpose of interposing the rubber springs to the right or left between the bail and its driver, as set forth.

2. In combination with a driver, B, provided with lugs E, a bail, C, having interior lugs F, with rubber springs H attached thereto, when constructed and arranged to operate substantially as herein described, and for the purpose set forth.

Witnesses:          ALBERT G. WALDO.
  W. W. YALE,
  G. C. MASKTRAIN.